United States Patent Office 2,808,420
Patented Oct. 1, 1957

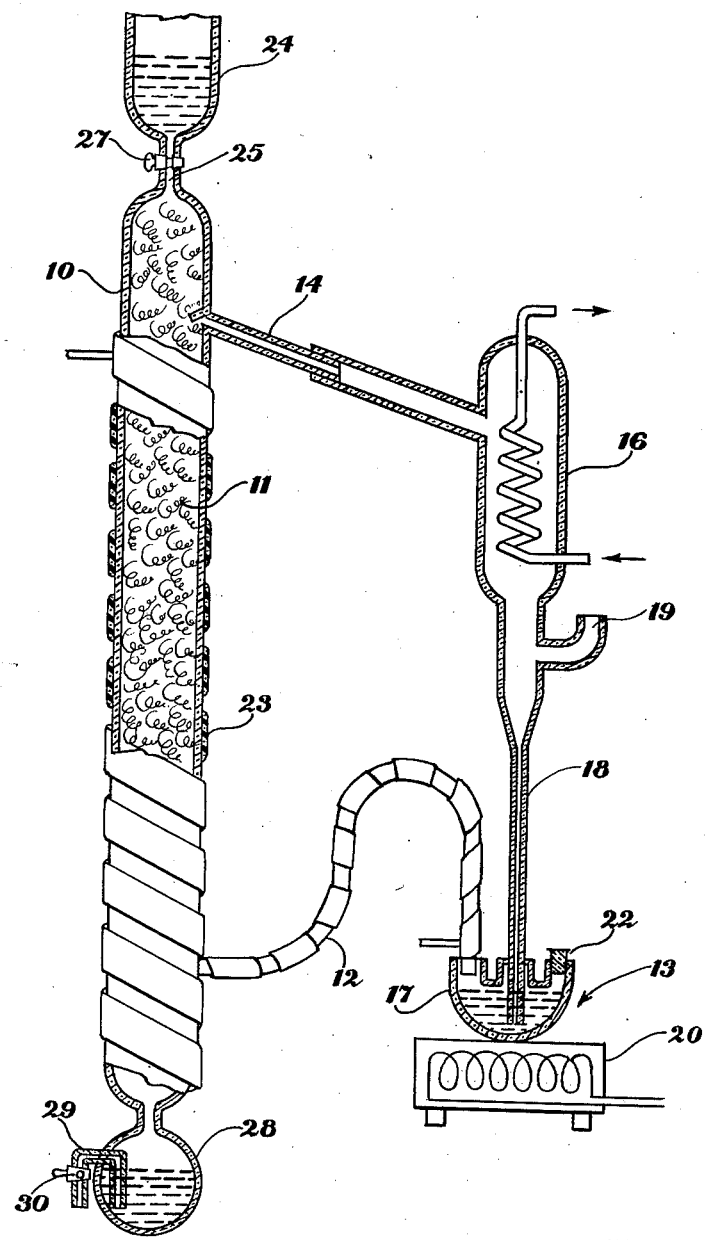

2,808,420
CONTINUOUS PROCESS FOR MAKING ACID CHLORIDES

Wilbert J. Humphlett, Rochester, N. Y., assignor to Eastman Kodak Company, Rochester, N. Y., a corporation of New Jersey Application June 9, 1954, Serial No. 435,647

4 Claims. (Cl. 260—408)

This invention relates to processes for effecting chemical reaction continuously and progressively and to apparatus for use in such processes. More particularly, the invention is concerned with a tangential process involving a combination of cyclic flow and inline flow of the components of the reaction system with reaction occurring in counterflowing liquid and vapor streams, and with apparatus adapted for carrying out the process continuously and progressively with substantially complete conversion of at least one of the reactants.

Many organic reactions are well known from the standpoint of the chemistry involved, and the reactants, reaction proportions, reaction conditions and the like have been worked out with great particularity within the bounds of known processes for effecting chemical reactions using known apparatus. While such chemical reactions thus proceed quite satisfactorily in laboratory operations, it is often difficult to effectively carry out the reactions on a commercial scale with high yields and high reaction rates and without objectionable side reactions, decomposition and the like which reduce yields and necessitate extensive product purification.

In the laboratory, it is customary to effect chemical reactions by discontinuous or batch processes, and usually such reactions are translated into plant scale operations using similar batch processes. This poses many problems because of the large capacity equipment which is needed, the problems involved in heating and cooling large volumes of reactants, the long reaction times necessary for economical yields with the attendant opportunities for unwanted side reactions and decomposition, and the difficulty in controlling or adjusting the reaction conditions except from batch to batch. Many chemical reactions are equilibrium reactions which can be driven to completion as regards one reactant only by the use of large excesses of the other reactant or reactants. Because of capacity limitations and economic factors it is not feasible to use the required excess necessary for substantially complete conversion, and the use of an excess of one reactant in batch operations makes the subsequent product recovery more difficult and costly.

Attempts have been made to carry out such reactions continuously by progressively mixing the reactants in a flowing stream and effecting the reaction progressively with a progressive removal of the resulting reaction mixture containing product. Although such continuous addition and withdrawal does obviate some of the heating and cooling problems, such processes are essentially flowing batch processes and hence are called continuous batch processes. As in the unmodified batch processes, the reactions are essentially equilibric in nature, and the continuous batch processes do not result in higher yields or higher reaction rates. The recovery of product from the equilibrium reaction mixtures involves the same problems as in the true batch processes with the exception that the recovery can be carried out continuously rather than waiting until the entire reaction has been effected. The yield per volume of reactants is usually little if any better than in a true batch process, and it is necessary to process large volumes of reactants. Such continuous batch processes have found greatest utility in polymerization reactions or the like in which equilibrium considerations are usually not a factor and where the product can be coagulated continuously and separated mechanically.

It is desirable, however, to provide a simple and straightforward process for effecting such common chemical processes as condensation, addition, halogenation and similar equilibrium reactions in continuous and progressive fashion using simple apparatus of low capacity but high throughput rates in which equilibrium factors can be largely overcome and conversion of at least one reactant and preferably all reactants is substantially complete in much shorter times than is possible with batch reactors of the same capacity in terms of yield per unit time. It is further desirable to be able to use large excesses of one of the reactants during the reaction without having to process large volumes of material to recover the product.

It is accordingly an object of this invention to provide a process for effecting equilibrium reactions continuously and progressively under conditions wherein the conversion of at least one of the reactants is substantially complete in greatly reduced reaction times and without the necessity for processing large volumes of reaction mixture in order to recover the desired product.

It is a further object of this invention to provide a tangential reaction system combining cyclic flow of one of the reaction components with inline flow of another component whereby the reaction component which has essentially linear flow is almost completely converted to the desired product and wherein the reaction time is determined only by the inline flow of such reaction component.

Another object of the invention is to effect chemical reactions in high yield and at a greatly accelerated rate without the necessity of using large capacity reactors and while overcoming the objectionable features of batch and continuous batch processes.

Another object of the invention is to provide new and improved apparatus for effecting chemical reactions by processes having the aforesaid advantages.

Another object of the invention is to provide apparatus particularly adapted for carrying out chemical reactions of the equilibrium type in tangential reaction systems wherein the yield of product is high without the necessity of using large volume reactors, and in which the desired product is formed continuously and progressively and can be progressively recovered in high concentration without the necessity of processing large volumes of reaction mixture.

Another object of the invention is to provide apparatus which can be operated continuously to produce chemical reaction products of excellent uniformity over prolonged periods of time without attention except for maintaining a continuous supply of the reactants to replace the reactants used up in the process.

Another object of the invention is to facilitate the large-scale production of chemical products obtained by an equilibrium reaction between chemical reactants of differing volatilities.

Another object of the invention is to effect chemical reactions in counterflowing liquid and vapor streams involving continuous circulation of the vaporized material in a cyclic system combined with inline flow of the liquid material to form a tangential reaction system.

Other objects will be apparent from the drawing and from the description and claims which follow.

These and other objects are attained by means of this invention as described hereinafter with particular reference to the apparatus illustrated in the single figure of the drawings.

The single figure is a view in elevation, partly broken away and in section, of a preferred embodiment of the apparatus for use effecting chemical reactions continuously and progressively in a tangential reaction system.

The present invention is applicable for use in carrying out any of the well known chemical reactions involving a wide variety of reactant combinations. In particular, the invention is concerned with effecting reaction wherein at least two of the components of the reaction system have different volatilities. In general, the apparatus embodying the invention is adapted for continuously and progressively effecting chemical reaction in counterflowing liquid-vapor streams between components of a reaction system including at least two components of substantially different volatilities. In the processes embodying the invention, a continuous circulation of the reaction component of relatively high volatility in cyclic fashion is established by progressively vaporizing such component in a vaporizing zone, continuously passing the vapors thus being generated from the vaporizing zone upwardly through a reaction zone defined within a packed column which is effective to cause the vapors to flow through a multiplicity of tortuous constricted fluid passages, progressively condensing the vapors emerging from the reaction zone after passage therethrough, and progressively returning the condensate to the vaporizing zone for revaporization. Thus, one of the components of the reaction system continually circulates in a cyclic system; and, as will appear hereinafter, this cyclically circulating component is usually one of the reactants entering into the actual chemical reaction but can be a solvent serving as the reaction vehicle. With this component circulating continuously in cyclic fashion, a reactant of relatively lower volatility is continuously and progressively introduced into the reaction system at the top of the reaction zone and is caused to flow downwardly in liquid form through the fluid passages in the reaction zone countercurrent to the upflowing vapors. Chemical reaction is effected in the counterflowing streams and the reaction product flowing to the bottom of the reaction zone is progressively withdrawn either into a suitable receiver below the reaction zone or out of the reaction system entirely.

The reactant of relatively low volatility thus undergoes essentially inline flow from the top to the bottom of the reaction zone where it is withdrawn in chemically converted form. This inline flow of one reactant combined with cyclic flow of another component with a common area of counterflow through the reaction zone thus prescribes a reaction system which geometrically resembles a circle and tangent, and the reaction systems of this invention have therefore been named tangential reaction systems based on the flow of the components during the process.

During the process of the invention, the reaction zone is maintained at a temperature which is effective to maintain the upflowing vapors in vapor form but which is ineffective to cause substantial vaporization of the less volatile reactant in the downflowing liquid or of the product formed by the reaction. In the preferred practice of the invention, the amount of reactant introduced at the top of the reaction zone for downward flow is correlated with the amount of product formed and being withdrawn from the bottom of the reaction zone whereby the conversion of this reactant is substantially complete. When the upflowing vapors are one of the actual reactants, as is usually the case, the flow of vapors is adjusted so that there is a large excess of the vapors over the amount used in the reaction. This tends to drive the reaction to completion as regards the downflowing reactant by displacing the equilibrium. Once this flow of excess vapors is established, the vaporized material is then also replenished at the rate the vapors enter into the chemical reaction and hence substantially complete conversion of both reactants being added is accomplished. Thus, when the reaction is established and the relative rates adjusted, the process can be carried on indefinitely with high conversions in short time and with good uniformity of product. Because the vapors circulate through the system, they provide the required excess for shifting the reaction equilibrium without giving large volumes of reaction mixture from which the product must be recovered. Instead the product is obtained in high concentration, and, in many cases, in sufficient concentration and purity for use without further purification.

The processes of this kind are effectively carried out in apparatus embodying the invention as illustrated in the drawings. In general, the apparatus comprises a packed column through which upflowing vapors are channeled from a suitable vaporizer assembly to a vapor outlet at the top of the reaction zone which leads the vapors to a downwardly directed condenser from which the condensed vapors are returned to the vaporizer assembly for revaporization. A suitable reservoir for the less volatile reactant is arranged for progressive and continuous feed into the top of the packed column and means are provided at the bottom of the packed column for collecting product.

Referring particularly to the drawings, a generally vertically disposed tubular column 10 which can be constructed of glass or inert metal, is filled with an inert packing material, such as glass helices as indicated at 11. The nature of the packing is not critical and any of the well known column packing materials can be used such as variously sized glass helices, glass beads, Berl saddles and similar packings such as are commonly used in the distillation column art and which permits fluid passages through the column along tortuous constricted channels. A vapor inlet tube 12 is arranged for channeling vapors from a vaporizer assembly 13 into a lower zone of column 10. A vapor outlet conduit 14 opens out of an upper zone of column 10 for channeling vapors from column 10 into a downwardly directed condenser 16. Condenser 16 in turn is connected for gravity flow of condensate into the reservoir 17 of vaporizer assembly 13 by means of condensate conduit 18, the conduit 18 extending into reservoir 17 a sufficient distance to end below the normal liquid level in reservoir 17. A vent 19 opens out of the lower end of condenser 16 for venting non-condensable gases to the atmosphere.

The vaporizer assembly 13 desirably comprises the reservoir 17 in which the more volatile component is vaporized, and a suitable heater 20 for effecting continuous vaporization. A stoppered inlet 22 permits introduction of material being vaporized into the apparatus as necessary to maintain the supply of this component during the reaction.

Column 10 and vapor inlet tube 12 are provided with a suitable heating means such as the ribbon heater 23 which is wound around inlet tube 12 over its entire length and around column 10 at least from the region of vapor inlet tube 12 to vapor outlet conduit 14. A feed reservoir 24 adapted to hold a charge of reactant is mounted at the top of column 10 and opens into column 10 through orifice 25 for continuous gravity flow of reactant into the packed column. The flow rate from reservoir 24 into column 10 is adjusted by means of valve 27.

The lower end of column 10 opens into product receiver 28 whereby product is progressively and continuously withdrawn from the reaction zone by gravity. A withdrawal tube 29 provided with a suitable valve 30 is arranged for withdrawing product from receiver 28.

In operating the apparatus illustrated in the drawings, a relatively volatile component which is either a reactant or a reaction solvent is charged into reservoir 17 and progressively vaporized by heater 20 whereby a continuous flow of vapors into column 10 through tube 12 is established. Heater 23 is energized sufficiently to maintain the reaction zone in column 10 between inlet 12 and outlet 14 at a temperature effective to maintain the vapors in vapor form. The stream of vapors passes upwardly through the multiplicity of tortuous constricted fluid passages formed by the packing 11 in column 10 and exit through outlet conduit 14. The vapors emerging from the column are continuously condensed in condenser 16 and flow downwardly through conduit 18 back into reservoir 17 for revaporization. Any non-condensable gases entrained in the vapor stream are vented from the apparatus at 19.

When a continuous circulation of the volatile component in the cyclic system has been established, the inline counterflow of the less volatile component is begun by opening valve 27 from reservoir 24. The less volatile component, in liquid form, flows downwardly through the tortuous constricted passages in the packing countercurrent to the upflowing vapors whereby the desired reaction is effected. The temperature in the reaction zone is adjusted so that the downflowing liquid and product formed therefrom are not substantially vaporized during travel through the reaction zone under gravity. The product formed is continuously removed by gravity from the reaction zone into receiver 28.

The relative rates of introduction of the counterflowing components can then be adjusted by adjusting valve 27 from feed reservoir 24 and by adjusting the vaporization rate in vaporizer assembly 13. The time necessary for passage of the downflowing liquid through the packed column will depend upon a number of factors such as the viscosity of the liquid at the reaction temperature, the length of the column, the type of packing and the like. By a suitable correlation of these factors and the proportions of reactant, it is often possible to effect substantially complete reaction of the downflowing reactant in a single passage through the reaction zone. This completeness of reaction is also assisted by employing the upflowing vapors in large excess whereby the reaction equilibrium is shifted toward complete reaction of the downflowing component. Once the proper correlation of conditions is achieved, the process can be maintained by progressive addition of reactants at the rate of product withdrawal and substantially complete conversion is continuously achieved.

The process embodying the invention is applicable for a variety of chemical reactions such as condensation, addition, halogenation and the like. In one of the embodiments of the invention, a normally solid material is melted and flowed downwardly in molten condition while vapors of another reactant are passed upwardly countercurrent to the downflowing melt. A typical example of this type of reaction is the formation of acid chlorides of normally solid fatty acids, as for example those containing up to 18 carbon atoms. Thus, for example, palmitic, oleic, stearic or a similar fatty acid can be flowed downwardly through the packed column in liquified form while thionyl chloride vapors are passed upwardly through the column. Reaction occurs in the few minutes necessary for any increment of the fatty acid to pass downwardly through the column, and a highly concentrated acid chloride of excellent quality is continuously withdrawn from the bottom of the column.

In another type of reaction, a solution of the less volatile reactant is passed downwardly countercurrent to the upflowing vapors. The solution can consist of the less volatile reactant dissolved in product obtained from the reactant, or in a suitable inert high boiling solvent or in some of the more volatile reactant. When crude reaction product is used as solvent, any unreacted components in the product get another chance to react and there is no large-scale purification necessary to separate product from solvent as is the case with an inert solvent. In many cases, the solvent for the less volatile reactant can actually have the same composition as the upflowing vapors. In this way the solvent also acts as a reactant and any unreacted portion tends to vaporize off in the lower zones of the column and join the vapor stream.

Two normally liquid materials of different volatility can also be used as counterflowing reactants. Thus the normally liquid lower fatty acids or substituted fatty acids can be chlorinated by upflowing thionyl chloride vapors. One of the most interesting processes embodying the invention involves the use of an inert solvent, suitable as a reaction vehicle, as the vaporized component which is continuously circulated in cyclic fashion and a mixture of the actual reactants is flowed downwardly through the column countercurrent to the vapors acting as reaction vehicle. Excellent reactions are effected in this way using reactants which normally are reacted in solvent media.

Some reactions are facilitated by the use of a suitable catalyst and the catalyst can be introduced with the downflowing liquid, or, if relatively volatile, can be vaporized and included in the upflowing vapor stream. The latter condition is particularly advantageous since the catalyst circulates continuously and does not contaminate the product.

The invention is illustrated by the following examples of different modes of practicing the invention. It will be understood that the examples are included for purposes of illustration and are not intended to limit the scope of the invention unless otherwise specifically indicated.

*Example 1*

A mixture of 200 ml. of thionyl chloride and 2 ml. of quinoline was charged into the vaporizer reservoir of apparatus such as is illustrated in the drawing. The mixture was heated until a continuous circulation of thionyl chloride was established, with the packed column (containing ⅛ inch glass helices) being maintained at a sufficiently high temperature to keep the thionyl chloride vapors from condensing in the column. A solution of 2,4-di-tert amyl phenoxyacetic acid (M. P. 123–125° C.) in four times its weight of warm 2,4-di-tert amyl phenoxyacetyl chloride was progressively introduced at the top of the column. The rate of formation of crude product from a column 50 cm. long and 2 cm. in diameter was 70 g. per hour. The product receiver was heated with a heating mantle to continuously boil out entrained thionyl chloride. The crude product after being heated under reduced pressure to remove all entrained thionyl chloride represented a 98% yield of crude product which contained only about 1% of free acid by infrared determination. This crude product was then distilled at 143–146° C. and 2 mm. pressure to give a nearly water-white product in a final yield of 85% based on the acid.

*Example 2*

A continuous circulation of acetone in the cyclic system was established and then a solution of 10 parts by weight of 2,4-di-tert amyl phenoxyacetyl chloride, 7 parts by weight of 2-amino-4,6-dichloro-5-methyl phenol hydrochloride, 8.3 parts by weight of dimethylaniline, 62 parts by volume of acetone and 9.4 parts by volume of water was progressively introduced at the top of the column. The reaction product withdrawn from the bottom of the column was diluted with 200 volumes of water and acidified with 11 volumes of concentrated hydrochloric acid. After standing for one hour, the precipitate which formed was filtered off, dried and recrystallized from 10 volumes of ligroin to give a 91% yield of white crystals melting at 158° C. This process, which forms a valuable coupler for use in photographic applications, is represented by the following equation:

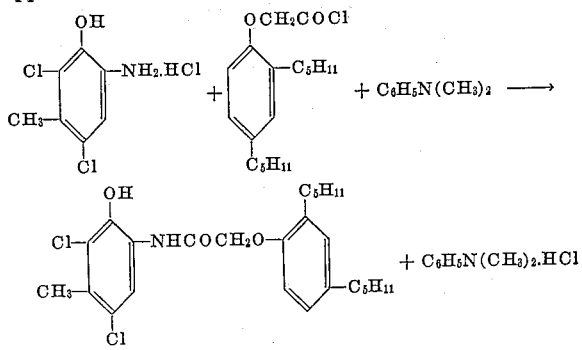

The yield rate from a column 23 inches long and 1 inch outside diameter was 40 g. per hour.

*Example 3*

The preparation of palmitoyl chloride by a batch reaction usually involves reactant contact times of 9–10 hours, and it is necessary to subject the product to vigorous purification in order to obtain light-colored product. In contrast to this, 50 g. of molten palmitic acid was progressively passed downwardly through the packed column of the apparatus of this invention countercurrent to thionyl chloride vapors. The palmitic acid was added at the rate of 120 g. per hour. A theoretical yield of palmitoyl chloride was obtained showing no trace of unreacted palmitic acid with the time of passage through the column being about 5 minutes for each increment of acid. Thionyl chloride entrained in the product was readily removed by heating on a steam bath under reduced pressure. The product was of sufficiently light color for many uses without distillation. A single distillation gave a water-white distillate of palmitoyl chloride boiling at 110–115° C. at 25 microns pressure.

*Example 4*

A continuous circulation of acetic acid was established through the cyclic system. A solution of 7.8 parts by weight of 1-(2,4,6 - trichlorophenyl) - 3 - m - aminobenzamido-5-pyrazolone and 6.2 parts by weight of 2,4-di-tert amyl phenoxyacetyl chloride in 75 volumes of acetic acid was progressively added to the top of the packed column and was converted to an amide, useful as a color coupler, during passage through the column. The crude product was collected at a rate of 60 g. per hour from a 23 inch column of 100 mm. inside diameter. Similarly, improved results are obtained with other reactions useful in the art. The size of the apparatus employed, of course, can be varied depending on the desired volume to be processed.

The invention thus provides improved processes for effecting chemical reactions continuously and at high reaction rates while avoiding long contact times and the necessity for large capacity reactors.

Although the invention has been described in detail with particular reference to certain preferred embodiments thereof, variations and modifications can be effected within the spirit and scope of the invention as described herein and as defined in the appended claims.

I claim:

1. In the process of forming an acid chloride by reacting thionyl chloride with an organic monobasic acid which is reactive with said thionyl chloride to form an acid chloride and which is of lower volatility than said thionyl chloride, the method of continuously and progressively converting said organic monobasic acid to the corresponding acid chloride which comprises establishing a continuous circulation of thionyl chloride in a cyclic system by progressively vaporizing thionyl chloride in a vaporizing zone, continuously passing thionyl chloride vapors from said vaporizing zone upwardly through a reaction zone defined within a packed column effective to cause flow of said vapors through a multiplicity of tortuous constricted fluid passages, progressively condensing thionyl chloride vapors emerging after passage through said reaction zone, and progressively returning the resulting thionyl chloride condensate to said vaporizing zone, progressively introducing said organic monobasic acid, in liquid form, to the top of said reaction zone and causing said monobasic acid to flow downwardly through said reaction zone countercurrent to the upflowing thionyl chloride vapors, maintaining said reaction zone at a temperature effective to maintain said thionyl chloride in vapor form and said monobasic acid in liquid form, progressively withdrawing acid chloride from the bottom of said reaction zone, and correlating the rate of addition of monobasic acid to the top of said reaction zone with the rate of withdrawal of acid chloride from the bottom of said reaction zone whereby the conversion of said monobasic acid to the corresponding acid chloride is substantially complete.

2. The method of continuously and progressively forming an acid chloride which comprises establishing a continuous circulation of thionyl chloride in a cyclic system by progressively vaporizing thionyl chloride in a vaporizing zone, continuously passing thionyl chloride vapors from said vaporizing zone upwardly through a reaction zone defined within a packed column effective to cause flow of said vapors through a multiplicity of tortuous constricted fluid passages, condensing thionyl chloride vapors emerging from the top of said reaction zone, and progressively returning the resulting condensate to said vaporizing zone, progressively introducing a fatty acid of 4–18 carbon atoms, in liquid form, to the top of said reaction zone and causing said fatty acid to flow downwardly through said reaction zone countercurrent to the upflowing thionyl chloride vapors, maintaining said reaction zone at a temperature effective to maintain said thionyl chloride vapors in vapor form and said fatty acid in liquid form, progressively withdrawing acid chloride from the lower end of said reaction zone, and correlating the amount of fatty acid being introduced at the top of said reaction zone with the amount of acid chloride being withdrawn from the bottom of said reaction zone whereby conversion of said fatty acid to the corresponding acid chloride is substantially complete.

3. The method of continuously and progressively converting palmitic acid to palmitoyl chloride which comprises continuously circulating thionyl chloride in a cyclic system by progressively vaporizing thionyl chloride in a vaporizing zone, continuously passing thionyl chloride vapors from said vaporizing zone upwardly through a reaction zone defined within a packed column effective to cause flow of said vapors through a multiplicity of tortuous constricted fluid passages, progressively condensing thionyl chloride vapors after passing through said reaction zone, and progressively returning condensed thionyl chloride to said vaporizing zone, progressively introducing palmitic acid to the top of said reaction zone and causing said palmitic acid, in molten form, to flow downwardly through said reaction zone countercurrent to the upflowing thionyl chloride vapors, maintaining said reaction zone at a temperature effective to maintain said thionyl chloride vapors in vapor form and said palmitic acid in molten form, progressively withdrawing palmitoyl chloride from the bottom of said reaction zone, and correlating the rate of introduction of palmitic acid to the top of said reaction zone whereby conversion of said palmitic acid is substantially complete.

4. The method of continuously and progressively converting 2,4-di-tert-amyl phenoxyacetic acid to 2,4-di-tert-phenoxyacetyl chloride which comprises continuously circulating thionyl chloride in a cyclic system by progressively vaporizing thionyl chloride in a vaporizing zone, continuously passing thionyl chloride vapors from said vaporizing zone upwardly through a reaction zone defined within a packed column effective to cause flow of said vapors through a multiplicity of tortuous constricted fluid passages, progressively condensing thionyl chloride vapors emerging from said reaction zone after passing therethrough, and progressively returning condensed thionyl chloride to said vaporizing zone, progressively introducing a solution of 2,4-di-tert-amylphenoxyacetic acid in 2,4-di-tert-amyl phenoxyacetyl chloride to the top of said reaction zone and causing said solution to flow downwardly through said reaction zone countercurrent to the upflowing thionyl chloride vapors, maintaining said reaction zone at a temperature effective to maintain said thionyl chloride vapors in vapor form but ineffective to cause substantial vaporization of said solution, and progressively withdrawing 2,4-di-tert-amyl phenoxyacetyl chloride from the bottom of said reaction zone.

References Cited in the file of this patent

UNITED STATES PATENTS

| | | |
|---|---|---|
| 1,141,266 | Raschig | June 1, 1915 |
| 2,483,963 | Barry et al. | Oct. 4, 1949 |
| 2,484,394 | Van Zwet | Oct. 11, 1949 |
| 2,500,934 | Dean | Mar. 21, 1950 |
| 2,553,845 | Clark | May 22, 1951 |

OTHER REFERENCES

Meyer: Monatshefte für Chemie, vol. 22, pp. 415–442 (1901).